United States Patent [19]

Will

[11] Patent Number: 4,797,938

[45] Date of Patent: Jan. 10, 1989

[54] METHOD OF IDENTIFYING MAGNETIC INK (MICR) CHARACTERS

[75] Inventor: Terry A. Will, Charlotte, N.C.

[73] Assignee: International Business Machines Corporation, Armonk, N.Y.

[21] Appl. No.: 178,793

[22] Filed: Mar. 31, 1988

Related U.S. Application Data

[63] Continuation of Ser. No. 787,391, Oct. 15, 1985, abandoned.

[51] Int. Cl.$^4$ ............................................. G06K 9/00
[52] U.S. Cl. ...................................... 382/7; 235/449; 382/29; 382/64
[58] Field of Search ...................... 382/7, 29, 64, 53; 235/449

[56] References Cited

U.S. PATENT DOCUMENTS

| | | | |
|---|---|---|---|
| 2,995,727 | 8/1961 | Quade | 382/7 |
| 3,528,058 | 9/1970 | Bond | 382/7 |
| 3,605,092 | 9/1971 | Richard | 382/7 |
| 3,629,829 | 12/1971 | Ordower | 382/7 |
| 4,143,356 | 3/1979 | Nally | 382/7 |
| 4,148,010 | 4/1979 | Shiau | 382/7 |
| 4,245,211 | 1/1981 | Kao | 382/7 |
| 4,356,472 | 10/1982 | Hau-Chun Ku et al. | 382/29 |
| 4,547,899 | 10/1985 | Nally et al. | 235/449 |

Primary Examiner—Leo H. Boudreau
Assistant Examiner—Joseph Mancuso
Attorney, Agent, or Firm—Kenneth A. Seaman

[57] ABSTRACT

A method of improving the accuracy of identifying or reading magnetic ink characters (MICR) of the type used on checks and other documents, by choosing key values of a waveform selected using one of several templates which best fits recognized peaks. The steps of the improved method include periodically sampling the signal generated from a magnetic read head, digitizing each sample, locating peaks (in an absolute-value sense), comparing the pattern of peaks against templates (stored values preferably in the form of a saw-tooth) representative of various periods and offsets between positive and negative peaks to determine which template fits the sensed peaks best, then using that template to select samples for identification of the character. The samples thus selected are preferably in the location of the peaks and zero-crossings predicted by the best template or pattern, but are not necessarily the peaks of zero-crossings themselves. If the character is not recognized, it may be identified as a reject, or alternatively, another template (such as the next best template) may be used. Advantageously, means for differentiating an ink spot from a character are also included in the system as is a system which normalizes the character over all the peaks and not just the initial perceived peak of the character.

8 Claims, 13 Drawing Sheets

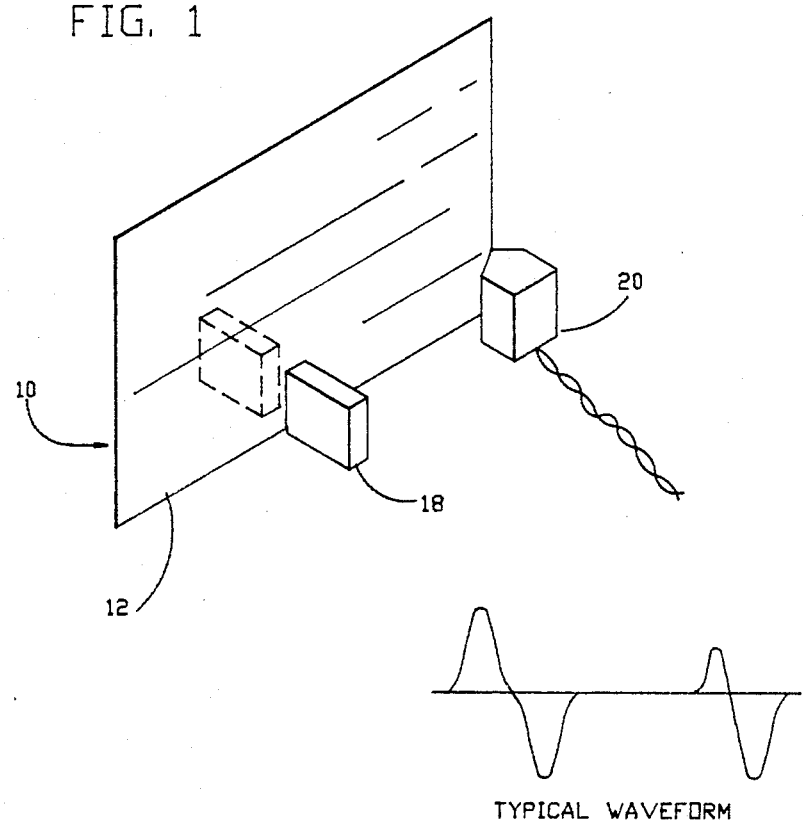

FIG. 2J
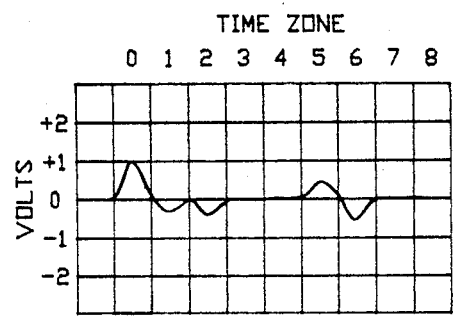
FIG. 2K
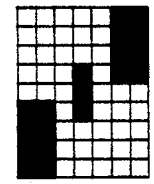
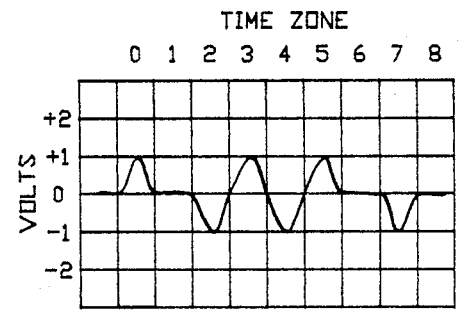
FIG. 2L
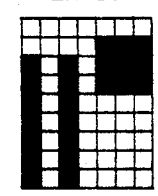
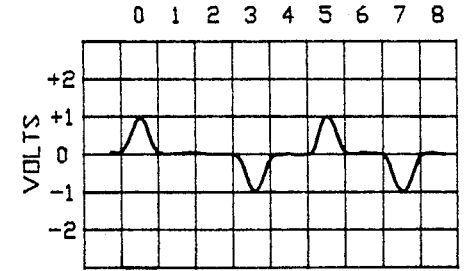

METHOD OF IDENTIFYING MAGNETIC INK (MICR) CHARACTERS

This is a continuation of co-pending application Ser. No. 787,391, filed on Oct. 15, 1985, abandoned.

BACKGROUND OF THE INVENTION

1. Field of the Invention

The present invention relates to improvements in methods of identifying magnetic ink characters. More particularly, the present invention relates to identification of characters which are written in magnetic ink and read at high speed by check reader/sorters. This invention has particular application, but is not necessarily limited to characters which are printed in magnetic ink (referred to as Magnetic Ink Character Recognition, or MICR) in a standardized format or font such as the "E13B" font and are included spaced from the lower edge of bank checks, deposit slips and other documents. Such bank checks or other documents are typically processed on a machine such as an IBM Model 3694 document processor (also referred to as a check reader/sorter) at speeds of 200–1000 documents per minute and with approximately 250–1000 characters passing by a single magnetic read head each second.

2. Prior Art

Several different techniques have previously been used for reading MICR characters on checks and other documents at varying speeds. Some reading techniques are based upon multiple vertically-spaced magnetic reading heads, each head for reading a horizontal portion or slice of the each entire code line (or each character, in sequence.) Such character machines are generally (at least in relative terms) expensive because of the additional hardware and logic required to coordinate, correlate and interpret the readings of the multiple heads. Another technique is to read characters optically using an optical character recognition (OCR) apparatus, either by itself or in combination with a magnetic sensing apparatus.

Another technique for reading magnetic ink character includes a rather large single magnetic read head which spans the entire height of a magnetic ink character. A voltage proportional to the amount of flux change sensed by the reading head is generated as an indication of the character features in such single gap magnetic ink character readers. Such machines are generally easier to design and build and less expensive, but have the limitation of requiring sophisticated algorithms to determine the characters which have been read. These machines have the limitation that either the characters on some number of the documents are not read (identified) at all (a condition designated as a "reject" in the industry) or if read, generates an identification of a character other than the character which is printed. The improper identification is referred to in the industry as a "substitution". The banking industry has determined that both substitutions and rejects are undesirable, yet the number of checks and other MICR-coded documents handled each year is ever increasing, requiring more reliable equipment in the banking and similar channels.

While checks are preprinted with MICR bank routing and customer account numbers when blank checks are printed, the right portion of the MICR-line is left blank and reserved for the amount of the check. This amount field is typically added in a process called "inscribing" the amount field when the first bank receives the check. Various check inscribing machines are commercially available and in use today, each of which is somewhat different in the quality with which characters are formed on the check and in terms of spacing between features on the individual characters.

In some machines, the checks can have perfectly formed characters, but apparatus for moving the check past the magnetic read heads may not move the check at a uniform rate, making the code line difficult to read.

A concept of "re-timing" or adjusting recognition logic for variations in speed of transport or printing variations is known in single gap magnetic reading systems of the prior art. All such known systems, however, make adjustments on the fly, or in real time, based upon the past history and not in response to a total character. Such systems, which are disclosed in U.S. Pat. Nos. 3,316,536; 3,528,058; and 4,356,472; can not adjust for isolated variations, and therefore can lead to errors in the reading of magnetic ink characters.

The magnetic ink character recognition systems in use today have the additional disadvantage that a small ink spot in certain regions of the character prevent the reading of the character, even if the remainder of the character is perfectly legible. This occurs, in part, because some machines assume that the first peak detected must normalize the reading for the entire character. While that system may work well when the first peak of a read character is a part of a real character, the reading of an ink spot as the first character "portion" ruins the system, leading to either a reject or a substitution in many cases, both of which are undesirable.

Yet another method of identifying characters simply identifies character peaks, either ignoring their location completely or assuming that the peaks occur at regular time intervals after an opening peak. U.S. Pat. Nos. 3,851,309 and 4,143,355 are illustrative of this technique. However, this technique is not reliable in the identification of characters, because the timing of the peaks is important to the proper recognition of characters (e.g., to determine whether a character is a "2" or a "5", the timing between the peaks is the significant factor.)

U.S. Pat. No. 2,995,727 illustrates a system for comparing signals to determine their similarity in a complex amplitude versus time arrangement such as speech and character recognition. U.S. Pat. No. 3,605,092 detects MICR characters while avoiding misstarts by looking at the slope of the MICR wave form to determine whether a peak is present. U.S. Pat. No. 4,148,010 reads magnetic ink characters with the timing set from the center of gravity of the sensed peaks.

U.S. Pat. No. 4,245,211 includes a method of adjusting the system timing to align the character feature changes with the intervals; it employs a phased locked loop response to the detected peaks to accomplish this.

Other limitations and disadvantages are well known to those skilled in the art of reading magnetic ink characters and processing the information obtained by magnetic reading heads.

SUMMARY OF THE INVENTION

The present invention overcomes the limitations and disadvantages of the present invention by providing a system for improved character reading in a single magnetic reading head. This improvement reduces the reject rate without a corresponding increase in the substitution rate.

The present invention achieves the imprvoed character reading by periodically sampling the signal generated from a magnetic read head, digitizing each sample, locating peaks (in an absolute-value sense), comparing the pattern of peaks against templates (stored values preferably in the form of a saw-tooth) representative of various periods and offsets between positive and negative peaks to determine which template fits the sensed peaks best, then using that template to select samples for identification of the character. The samples thus selected are preferably in the location of the peaks and zero-crossings predicted by the best template or pattern, but are not necessarily the peaks or zero-crossings themselves.

This invention has the advantageous effect that characters which have been printed by a low quality inscriber may be read without substantial rejects or substitutions being incurred. Thus, it has the advantage that a greater percentage of the documents which a bank or other establishment might have can be read using automated (high speed) equipment, rather than low speed manual processing which is more subject to error.

A further advantage of the present system is that the appropriate timing for a character is determined by reference to the entire chracter, and not merely by a portion of that character. This allows the system to compensate for random, or not periodic, variations in the reading of a character. The application of the adjustment process to a stored character as provided in the present invention also allows a second pattern to be applied to the character should the character remain unidentified after the first pattern has been used. Of course, those systems which provide retiming on the fly have lost forever the information which might have been acquired through the use of a second pattern.

The provision of an accurate and dependable method for identifying characters allows for the system of the present invention to ignore small ink spots which otherwise lead to a reject (unread) character, or worse yet, a substituted character, in which the system reads incorrectly the character which is there. This ignoring of ink spots is accomplished in the present system by retrying a character which cannot be identified by ignoring the introductory peak if the distance between characters is consistent with the opening peak being an ink spot. Later ink spots may be automatically ignored merely by being located at places where peaks are not expected.

In the present system, each character is normalized over all the peaks in the character and not just the opening peak of the character, which may be abnormally large or small. This normalizing, or scaling the magnetic reading of the character, based upon all of the peaks allows a narrower band to be specified for the character without sacrificing accuracy in the recognition of the character.

Other objects and advantages of the present invention will be apparent to those skilled in the art in view of the following description of the preferred embodiment, taken together with the appended claims and the accompanying drawings.

BRIEF DESCRIPTION OF THE DRAWINGS

FIG. 1 is a perspective view of a check having a MICR code line and a magnetic character reading system.

BEST MODE OF CARRYING OUT THE INVENTION

FIG. 1 illustrates the environment of one application of the present invention in which a check 10 bearing a code line 12 including a plurality of magnetic ink characters 14 is carried past a single gap magnetic read head 20. The check 10 (or other document) is driven in its preferred embodiment at a relatively uniform rate by drive mechanism such as rollers (not shown.) The environment for the check magnetic ink reader of the present invention might be an IBM Model 3694 check reader/sorter which is presently known, but many other check readers are known and used.

FIG. 2 illustrates the magnetic ink chracters of a font known as E13B used in processing checks in the United States. The associated electrical waveform generated by scanning from right to left on the check as the viewer looks at the codeline 12 on the check are also shown in this view associated with each such character. This font is limited to the characters shown in this view, and is an industry standard as agreed by the American Bankers Association, but other predetermined fonts could be used to advantage in the present invention.

Figure 2A:
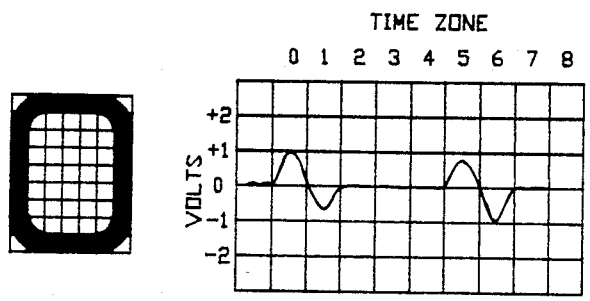
FIG. 2 is a time/voltage plot of electrical signals which may be produced by the magnetic ink character reading system of FIG. 1 when reading characters from the E13B type font printed on checks and other documents in the United States.
Figure 2B:
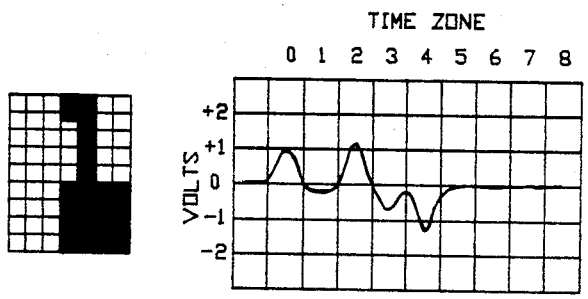
Figure 2C:
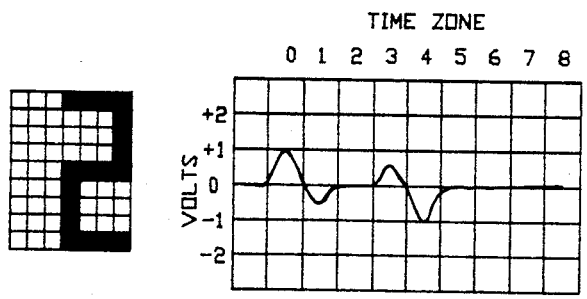
Figure 2D:
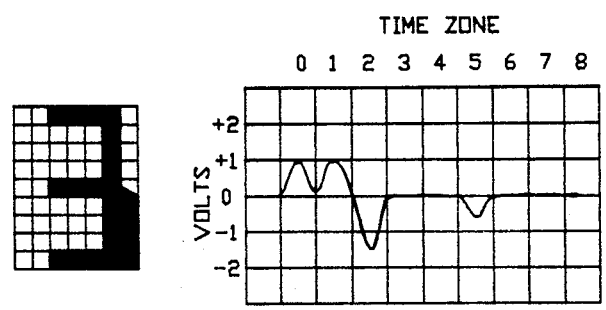
Figure 2E:
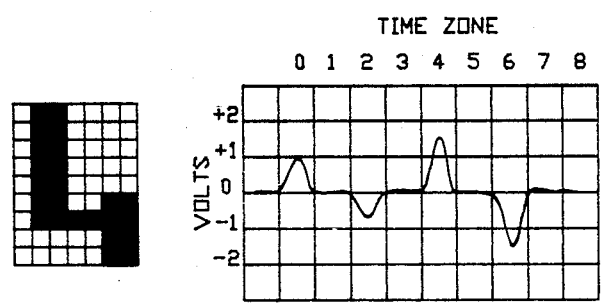
Figure 2F:
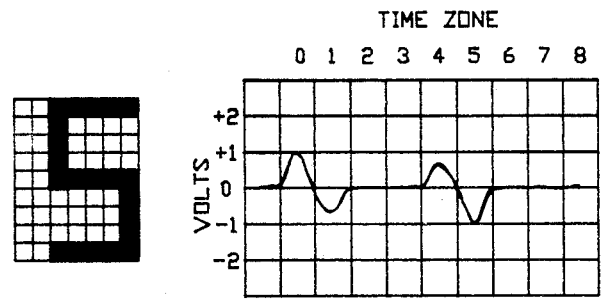
Figure 2G:
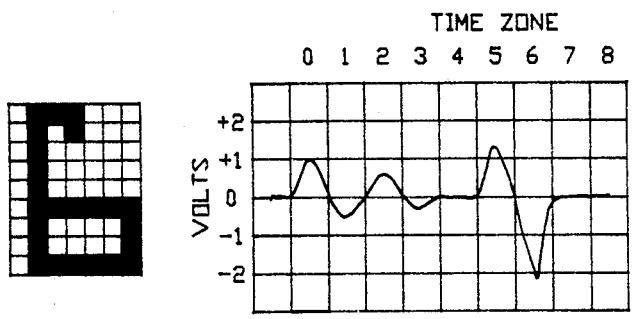
Figure 2H:
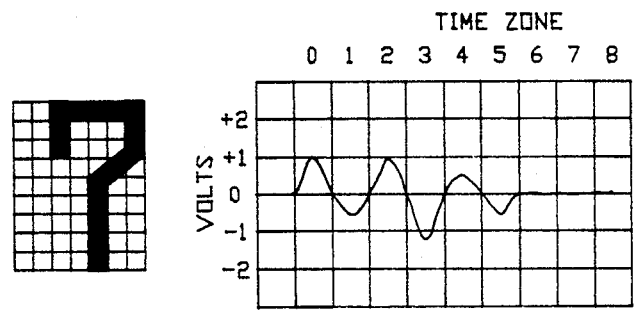
Figure 2I:
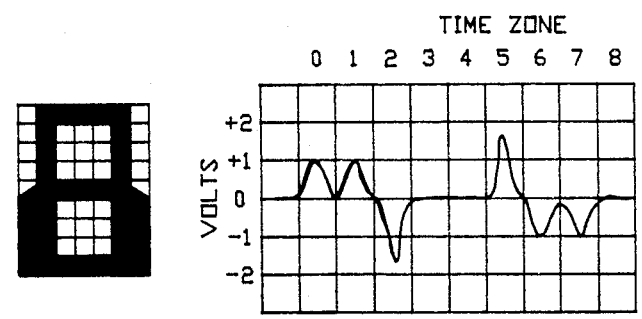
Figure 2M:
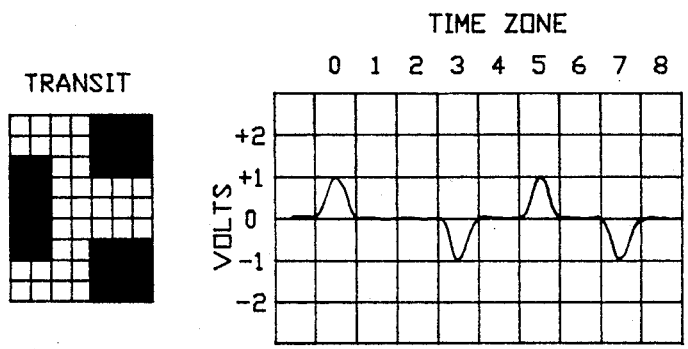
Figure 2N:
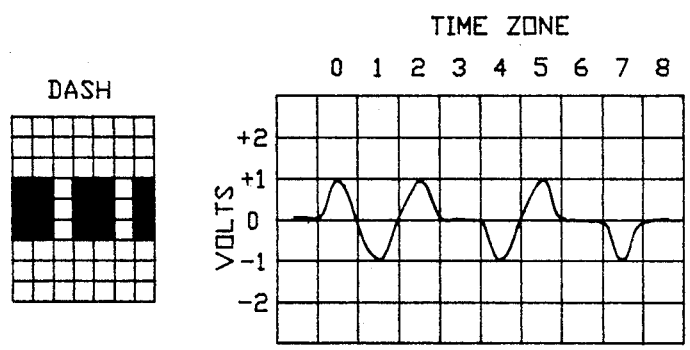
Figure 3:
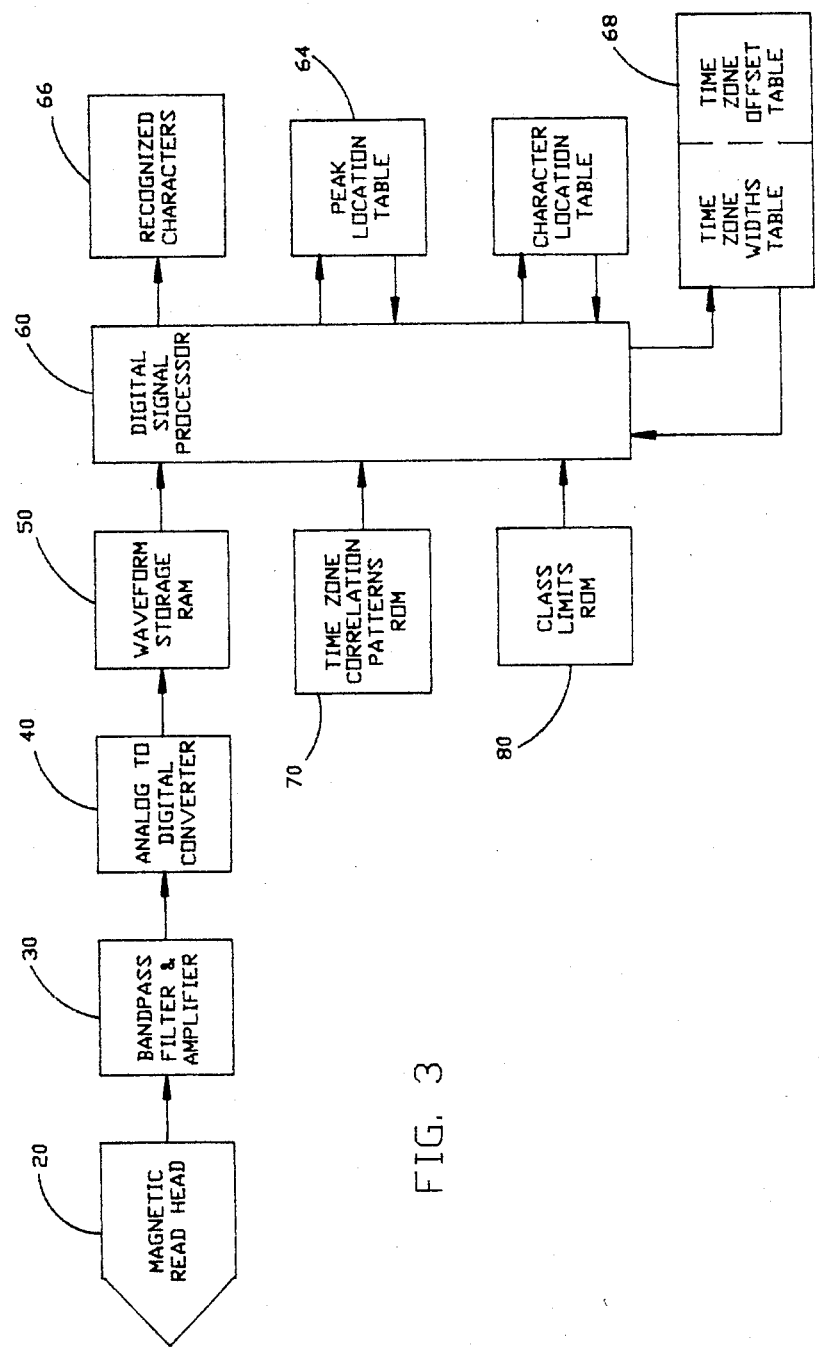
FIG. 3 is a block diagram flow chart of the information processing used to process the information read from the a check in FIG. 1, particularly signals shown in FIG. 2.

FIG. 3 shows a block diagram of the system of the present invention. As shown herein, the magnetic read head 20 described in connection with FIG. 1 provides a time-varying analog signal to band pass filter and amplifier 30, which in turn is coupled to an analog to digital converter 40 to digitize the signals on a periodic basis. The digitized values are then stored sequentially in a waveform storage random access memory 50, which is used an an input to the digital signal processor 60 which is described in connection with FIGS. 4–7. The digital signal processor 60 uses two tables, a character location table 62 and a peak location table 64 interactively during its processing as described later. The output from the signal processor 60 are recognized characters shown at block 66. Block 68 depicts a table of time zone widths and time zone offsets which are stored as a result of testing various templates against a pattern of identified peaks, preferably in a sorted arrangement with the best template first.

Other inputs to the digital signal processor 60 are a time zone correlation patterns read-only-memory (ROM) 70 and a class limits read-only-memory 80, both of which will also be described in greater detail in connection with FIGS. 4–7.

Figure 4:
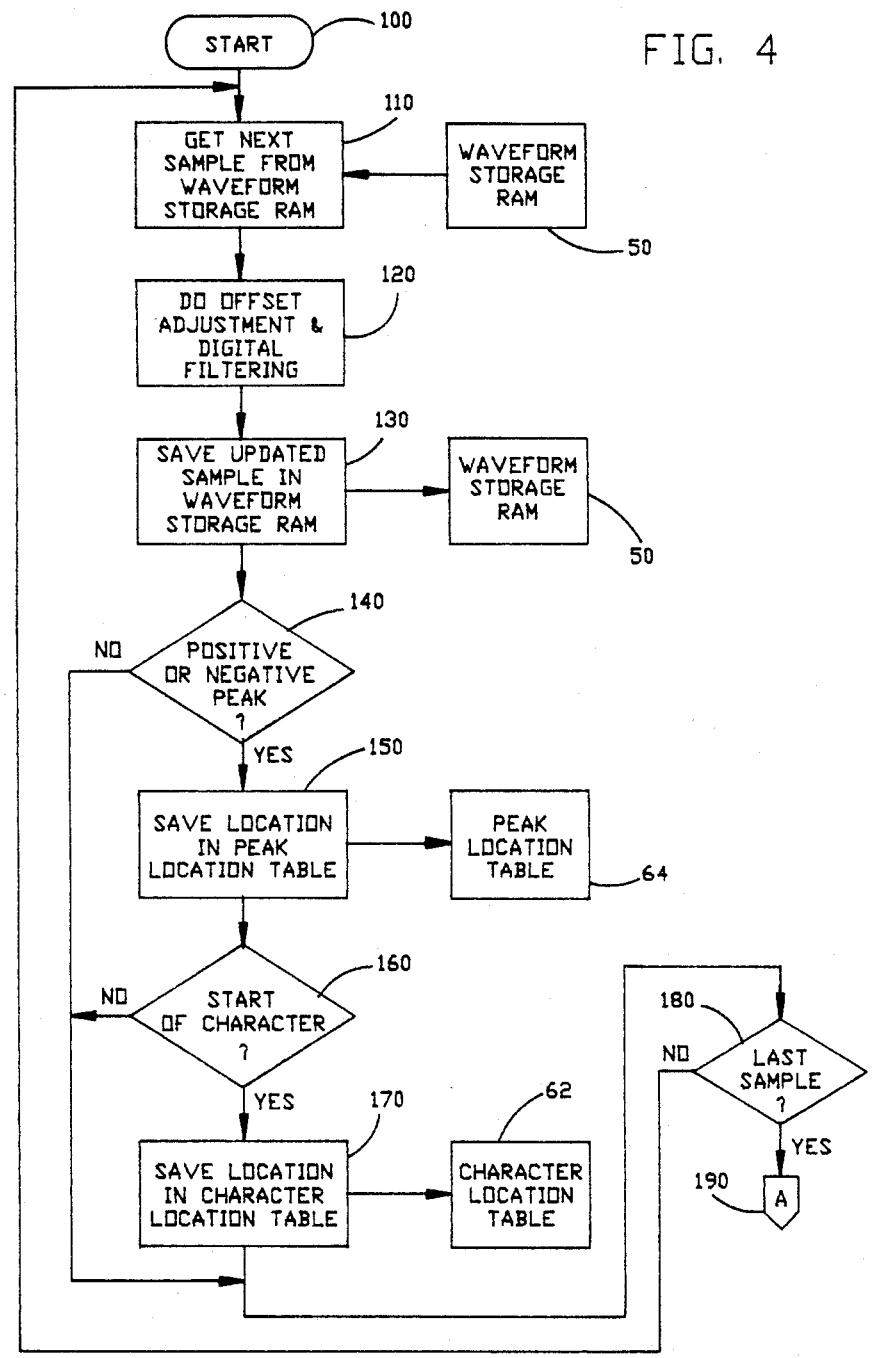
FIGS. 4–7 are detailed block diagrams of portions of the the block diagram of FIG. 3.

FIG. 4 shows the initial processing performed by the digital signal processor 60 of FIG. 3. From a start block 100, control passes to block 110 where the next sample from the waveform storage RAM 50 is obtained. Offset adjustment and digital filtering are performed at the block 120, then at block 130, the updated and corrected value is stored back into the block 50. Next, whether it is a positive or negative peak is determined at block 140 by comparing the present value to its adjacent value, in an absolute sense. If the present value is a relative peak, it is stored in the peak location table 64 via block 150; otherwise, control passes to the block 180 where whether this is the last sample is determined. If this is not the last sample, the process of this FIG. 4 from the block 110 is repeated; if this is the last sample, this FIG. 4 is exited through the connector A (block 190) to FIG. 5, as described later. From block 150, after the peak has been stored, whether this is (or could be) the start of a character is determined at block 160. If this is the start of a character, then at block 170 the location of the start of the character is stored in the character location table 62 before again testing at the block 180 whether this is the last sample and going either to block 190 if it is or to block 110 if it is not.

Figure 5:
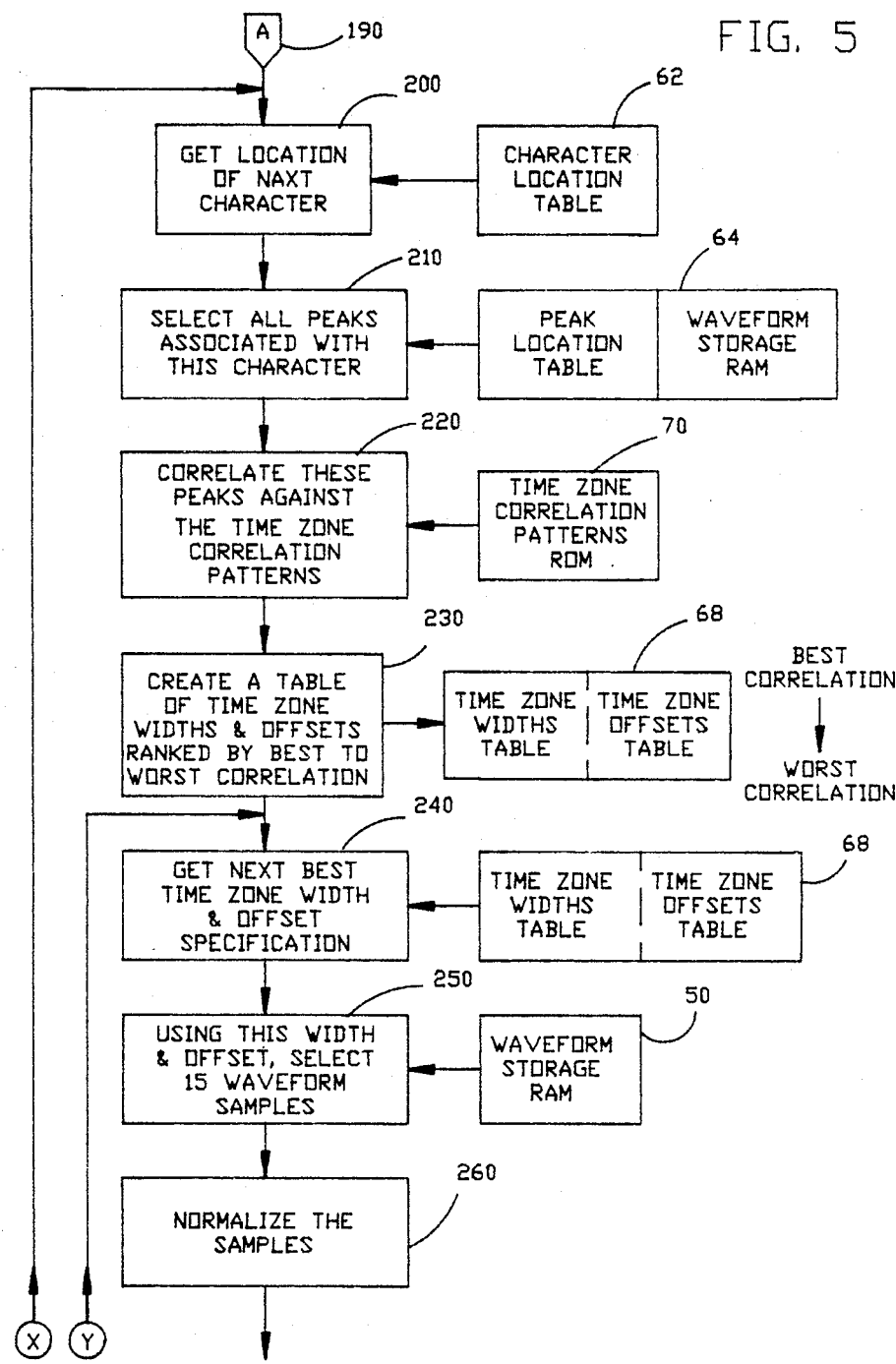

FIG. 5 shows the continuing processing from the exit block 190 of FIG. 4. At block 200, the location of the next (or first) character is obtained from the character location table 62. At block 210, all peaks associated with that character are obtained from the peak location table 64. At block 220, these peaks associated with this character are tested against respective time zone correlation patterns stored in the ROM 70. Each time zone pattern includes time-values of a repeating pattern, saw-toothed in its preferred embodiment, of slightly differing periods and offsets between its positive and negative peaks as will be discussed later, so that the amount of correlation between the peak pattern and each time zone pattern is noted. At block 230 these correlations are sorted and stored into a table of the time zone widths and offsets from the best correlation to the worst correlation, which correlation is obtained by summing the products of each peak with the stored time zone correlating patterns, the greatest sum then indicating the best fit.

At block 240 then the next (best, starting with the first) time zone width and correlation from the table 68 is then used to attempt to match the pattern at block 250. This is accomplished by using this presumed best pattern to select 15 waveform samples at the peaks and zero-crossings (for example) to identify the waveform character in due course through the following steps. At this point the processing shifts from using the identified peaks to using the selected patterns of presumed peaks and zero crossings from the original waveform storage RAM 50. These 15 samples are then normalized at block 260 to average all of the peaks and not just scale the readings based upon the first peak as prior art systems have done.

Figure 6:
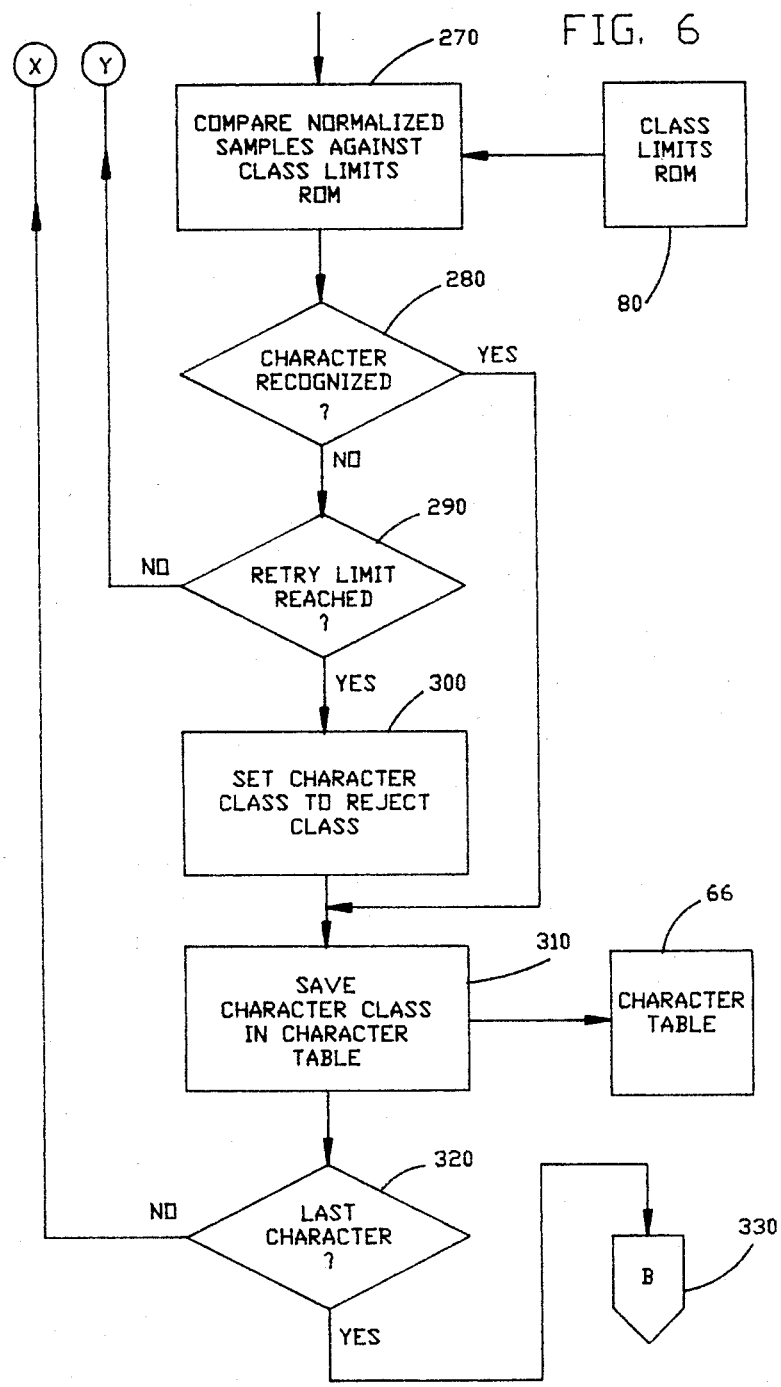

Referring now to FIG. 6, the normalized samples are compared to class limits stored in ROM which are representative of maximum and minimums of the selected 15 samples chosen at the block 250 against the historical values determined for each character. This comparison is similar to that proposed by Rohrer and described in IBM Technical Disclosure Bulletin, Volume 23, No. 6, Pages 2261-2262. At block 280, a character is recognized if the sum of the variation from the stored values for class limits in 80 for a given character is less than a preset threshold. If the character is recognized, control transfers to block 310, otherwise, the question of whether a limit on the number of trials has been reached (perhaps only the best six time zone widths and offsets will be tried) is answered. If the character was not identified and the retry limit has not been reached, then control returns to the block 240 for trying the next best time zone pattern. If the retry limit was reached at the block 290, then the character is identified at block 300 as a reject (at least temporarily, see FIG. 7 and the related description) and control continues to block 310 where the character or reject is stored in the recognized characters list 66.

Then, if this is not the last character as determined at block 320, control returns to block 200 (FIG. 5) to get the next character and repeat the process. If this was the last character on a given document, then a first pass in the process of identifying characters has been completed and only the rejects remain to be identified, if possible, as described in connection with FIG. 7 from block 330.

Figure 7:
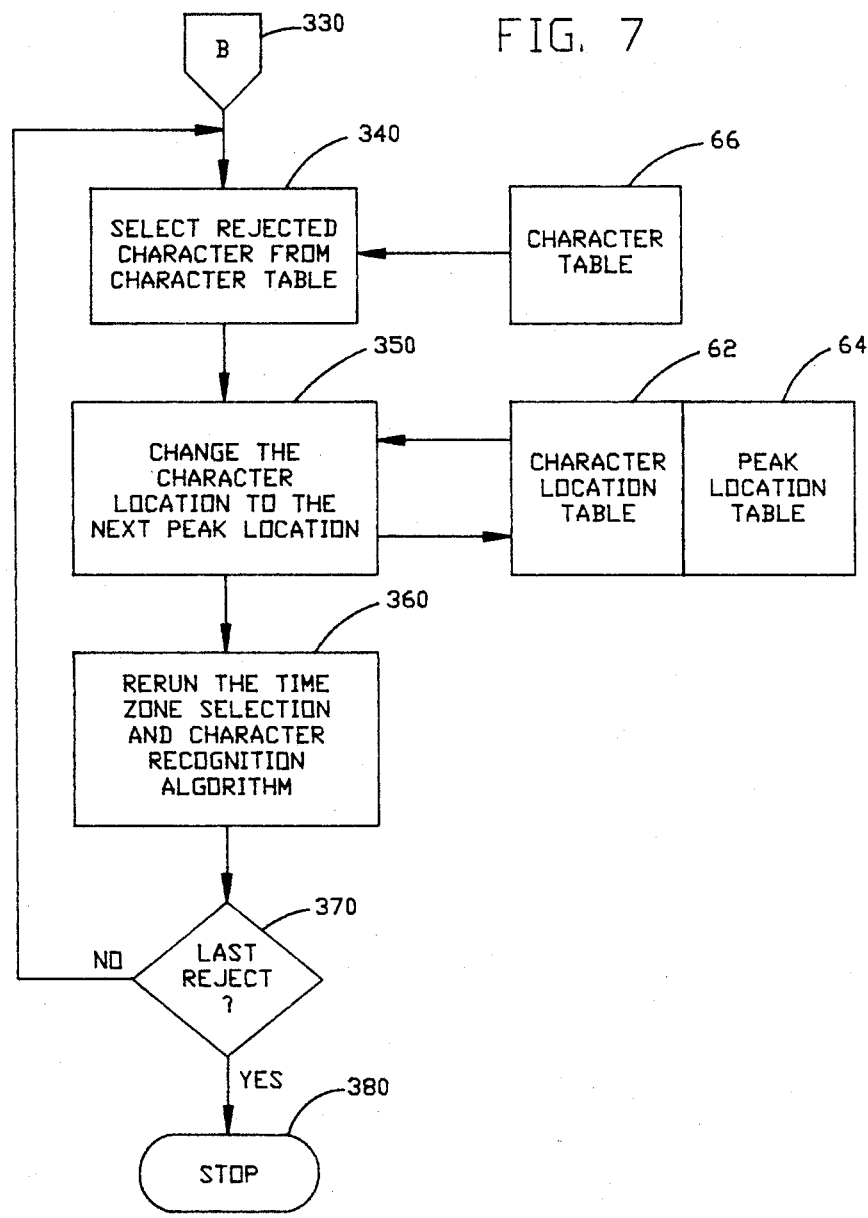

FIG. 7 begins the process of attempting to identify reject characters from the block 330 (the end of FIG. 6), by locating the first reject at block 340 from the recognized character list 66. At block 350, the first peak is ignored and the second peak is presumed to be the beginning of the character. Then at block 360 the time zone selection process of blocks 200-290 is repeated. If the character is identified through this process, then the reject is replaced with the character identified, otherwise the reject status continues and the system decides whether the present reject is the last reject. If it is, the system has been completed and it exits from block 380, otherwise it returns to the block 340 to process the next reject.

FIG. 8 illustrates a waveform 400 of a typical character—in this case a "0"—read by the magnetic head 20 of FIG. 1 and samples at the rate of 80,000 per second. This is in a system in which the checks or other documents are passing the reading head at the rate of 150 inches per second, to permit a nominal value of seven samples per standard MICR time zone. In the ABA standard, each time zone is 0.013 inches in width, although experience has shown that some inscribers print time zones which are either somewhat greater or smaller than the standard.

FIG. 8A, 8B, 8C and 8D illustrate a waveform 400 from a character after reading and digitization, which is stored in the waveform storage RAM 50. Also shown in each figure is the corresponding saw-tooth waveforms 420, 430, 440 and 450 in FIGS. 8A, 8B, 8C and 8D, respectively. Each of the saw-tooth waveforms are stored, in the preferred embodiment for this invention, in the time zone correlation pattern ROM 70. Each saw-tooth pattern includes a positive or upper saw tooth pattern and a lower or negative saw tooth pattern. For ease in description, the upper saw-tooth pattern will be referenced with the suffix "a" (as in 420a for the upper saw tooth pattern in FIG. 8A) and the lower or negative saw-tooth pattern will be referenced by the suffix "b" (as in 420b).

Figure 8A:
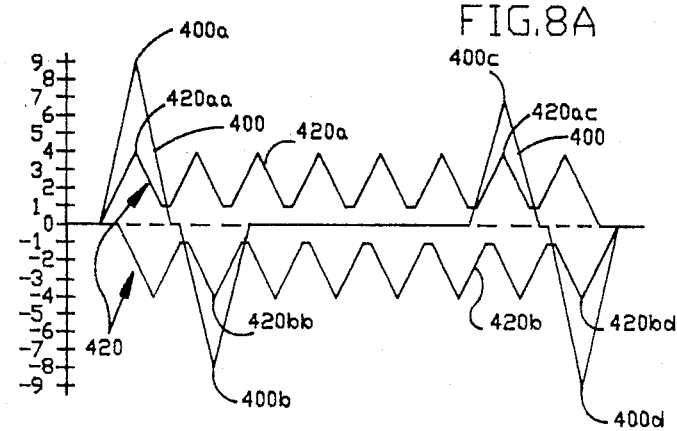
FIGS. 8A–8D are plots of the electrical signal reading of one character from a representative document, illustrating the character and various templates used to select certain key values from the plot in accordance with the present invention.

FIG. 8A represents a plot of the saw tooth 420 in which the period of the saw-tooth is chosen to be 7.0 samples per time zone (0.013 inches of travel), with negative peaks in its lower saw tooth portion 420b being two samples advanced from positive peaks in its upper saw-tooth portion 420a. For the purpose of correlation, positive peaks in the actual waveform 400 from the waveform storage RAM 50 are compared with the upper saw tooth pattern (e.g., 420a) and the negative peaks in the waveform 400 stored in the RAM 50 are compared with each lower, or negative, saw-tooth pattern (e.g., 420b).

As shown in FIG. 8A, the waveform 400 includes four peaks (in an absolute value sense, where magnitude is considered and not its sign or direction). These peaks are marked 400a, 400b, 400c, and 400d and represent a relative positive peak, a relative negative peak, a relative positive peak and a relative negative peak, respectively. For each peak location, its stored value is determined and multiplied by a corresponding value for the saw-tooth waveform of the same polarity (positive or negative). Thus, for the peak 400a, its stored value (9) is multiplied by the corresponding value in the saw tooth (at location 420aa) which is 4 to get a first product of 36. Similarly, for the second peak 400b, the product of its value (−8) is multiplied by the value of 420bb (−4) to obtain a second product of 32. Likewise, a third product and a fourth product representing the value of 400c times 420ac and 400d times 420bd are obtained. The sum of all products for a given time zone width and offset are calculated and stored in association with the width and offset for later ordering to determine the best fit. The best fit is defined as the width and offset which produces the greatest sum of the products, thereby indicating the best correlation of the saw-tooth with the actual pattern of the peaks.

Figure 8B:
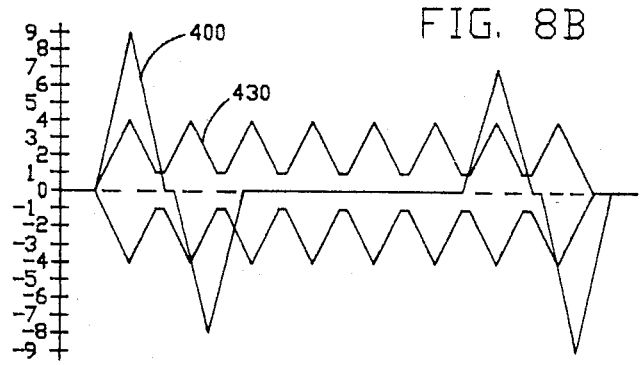
Figure 8C:
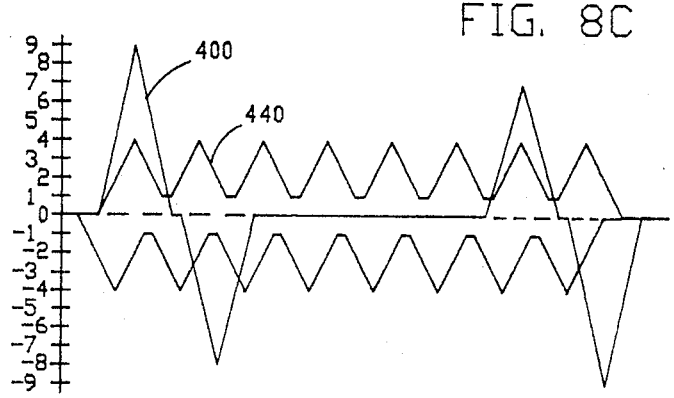
Figure 8D:
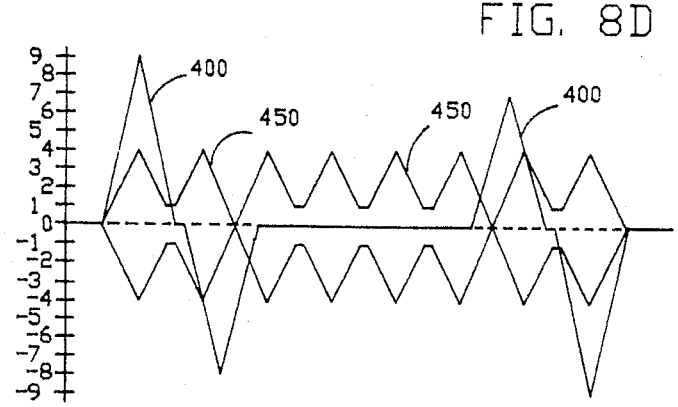

For the time zone width and offset shown in FIG. 8A, the sum is 132, calculated as described above. Similar calculations for the time zone width of 7.0 and no offset between positive and negative peaks as shown in FIG. 8B leads to a sum of 98. Likewise, in FIG. 8C, a time zone width of 7.0 and a negative peak offset of −2, or having the negative peaks lead the positive peaks by two periods, leads to a sum of the products of the waveform peaks and the saw-tooth values of 72. In FIG. 8D, the offset between positive and negative peaks is chosen to be zero, but the period of the time zone (its width) is chosen to be 7.25 samples per nominal character width of 0.013 inches. In this case, the sum of the products (calculated as in FIG. 8A, but with different values for the saw tooth) is 102.

In practice, it has been found that three different time zone widths (e.g., 6.75, 7 and 7.25) and seven different offsets between positive and negative peaks should be enough different trials to determine a best fit for many different printings of magnetic ink characters. However, depending on the experience and other factors, more or less may be desirable in actual prctice. Additionally, different time zone widths such as 6.875, 7, and 7.125 may be tried. Additionally, while the preferred embodiment includes the storage of the waveform values as saw-tooth patterns in a ROM for quick look-up, in some instances it may be desirable to calculate or approximate the values of the pattern without storage, or from some analog generator. It may also be desirable to use a sine or cosine generator, rather than the saw-tooth values.

If the four examples shown in FIGS. 8A, 8B, 8C and 8D are the only widths and offsets to be tried, one obtains the result that FIG. 8A is the best correlation (132 as the sum), FIG. 8D is the next best correlation (sum=102), followed by FIG. 8B (sum of 98) and 8C (sum of 72). The values of some key locations (preferably predicted peaks and zero-crossings), perhaps approximately 15 in number, would then be chosen using the period and offset of FIG. 8A first to determine values to be tested using the maximum and minimum expected values for each character in the repertoire to determine if these selected values identify a character, using the method described in Rohrer's article in the IBM Technical Disclosure Bulletin mentioned above. If the offset and period or width from FIG. 8A do not produce an acceptable match of a character, then the period and offset from the next best pattern are used to select key locations for identification, in this case using the values of FIG. 8D. The process is then repeated using FIG. 8B values if the character still is not identified. Of course, other methods of evaluating the matching or non-matching nature of waveform samples could be used after using the sample selection algorithms described in this patent are used.

Program listings written in PL1 to accomplish the functions of FIGS. 3–7 is as follows, with portions of the program annotated to correspond to blocks described in connection with FIGS. 3–7. Of course, other programs in other languages could be used to advantage in the present invention. Is also possible that hard wired logic could be used to advantage to implement the functions, or at least some of them, described in the present patent.

```
FILE: MICRSIM    PLI       A    CMS 3.2  (PUT 8408)  SLU 310

/*---------------------------------------------------------------*/  00000100
/* PROGRAM      -- MICRSIM                                       */  00000200
/* PROGRAMMER   -- TAW                                           */  00000300
/* DATE         -- 08/21/85                                      */  00000400
/*                                                               */  00000500
/* DESCRIPTION  -- DIGITAL READ SYSTEM SIMULATION PROGRAM.       */  00000600
/*---------------------------------------------------------------*/  00000700
                                                                     00000800
MICRSIM: PROC (PARM) OPTIONS (MAIN) REORDER;                         00000900
                                                                     00001000
/*---------------------------------------------------------------*/  00001100
/* CONTROL PROGRAM DECLARES                                      */  00001200
/*---------------------------------------------------------------*/  00001300
                                                                     00001400
       DECLARE                                                       00001500
          CONDCODE FIXED BINARY(31),                                 00001600
          DATE BUILTIN,                                              00001700
          DOCCNT FIXED BINARY(15) INIT(0),                           00001800
          DOCID CHAR(16) INIT('00000u.0000.0000'),                   00001900
          I,J,K,L,M,N FIXED BINARY(15),                              00002000
          MICRIN FILE INPUT,                                         00002100
          MICROUT FILE OUTPUT,                                       00002200
          MICRREC CHAR(13020) VAR,                                   00002300
          MICRRECPTR FIXED BINARY(15),                               00002400
```

```
            PARM CHAR(100) VAR,                                  00002500
            SYSPRINT FILE OUTPUT PRINT,                          00002600
            TEMPB BIT(16) BASED(TEMPPTR) ALIGNED,                00002700
            TEMPC (1:2) CHAR(1) BASED(TEMPPTR) ALIGNED,          00002800
            TEMPF FIXED BINARY(15) ALIGNED,                      00002900
            TEMPPTR POINTER,                                     00003000
            TIME BUILTIN;                                        00003100
                                                                 00003200
/*-----------------------------------------------------------*/  00003300
/* RECO PARAMETERS                                           */  00003400
/*-----------------------------------------------------------*/  00003500
                                                                 00003600
         DECLARE                                                 00003700
            BGMIN FIXED BINARY(15) INIT(138),   /* MINIMUM PEAK VAL*/ 00003800
            CLASSERRH FIXED BINARY(15) INIT(20), /* CLASS ERROR HI */ 00003900
            CLASSERRL FIXED BINARY(15) INIT(10), /* CLASS ERROR LO */ 00004000
            CLASSA FIXED BINARY(15) INIT(10),                    00004100
            CLASSB FIXED BINARY(15) INIT(11),                    00004200
            CLASSD FIXED BINARY(15) INIT(13),                    00004300
            CLASSE FIXED BINARY(15) INIT(12),                    00004400
            CLASSI FIXED BINARY(15) INIT(14),                    00004500
            CLASSR FIXED BINARY(15) INIT(15),                    00004600
            CODECNT FIXED BINARY(15),                            00004700
            CODELINE CHAR(66) VAR,                               00004800
            CODECLASS (0:65) FIXED BINARY(15),                   00004900
            CW1 FIXED BINARY(15) INIT(28),      /* NEW CHAR SPACING*/ 00005000
            FILTER FIXED BINARY(15) INIT(2),    /* FILTER OPTION  */ 00005100
            F2C0 FIXED BINARY(15)               /* FILTER CONSTANTS*/ 00005200
            F2C1 FIXED BINARY(15)                                00005300
            F2C2 FIXED BINARY(15)                                00005400
            F2C3 FIXED BINARY(15)                                00005500
            F2C4 FIXED BINARY(15)                                00005600
            GRIDLIM FIXED BINARY(15) INIT(5),                    00005700
            IW1 FIXED BINARY(15) INIT(25),      /* ANY INK SPOT   */ 00005800
            IW2 FIXED BINARY(15) INIT(125),     /* 1 PEAK INK SPOT*/ 00005900
            RETRY FIXED BINARY(15) INIT(1),     /* RETRY OPTION   */ 00006000
            RW1 FIXED BINARY(15,1) INIT(31.5),  /* RETRY SPACING LO*/ 00006100
            RW2 FIXED BINARY(15,1) INIT(35.5);  /* RETRY SPACING HI*/ 00006200
                                                                 00006300
/*-----------------------------------------------------------*/  00006400
/* RECO DECLARES                                             */  00006500
/*-----------------------------------------------------------*/  00006600
                                                                 00006700
         DECLARE                                                 00006800
            ADCCPTR FIXED BINARY(15,1),                          00006900
            ADCFPTR FIXED BINARY(15,1),                          00007000
            ADCPPTR FIXED BINARY(15,1),                          00007100
            ADCPKCNT FIXED BINARY(15),                           00007200
            ADCPKNDX FIXED BINARY(15),                           00007300
            ADCPKPTR (0:399) FIXED BINARY(15,1),                 00007400
            ADCSPTR FIXED BINARY(15,1),                          00007500
            ADCBFRB (-1:2400) BIT(16) BASED(ADCBFRPTR) ALIGNED,  00007600
            ADCBFRC (-1:2400,1:2) CHAR(1) BASED(ADCBFRPTR) ALIGNED, 00007700
            ADCBFRF (-1:2400) FIXED BINARY(15) ALIGNED,          00007800
            ADCBFRS CHAR(6144) VAR BASED(ADCBFRPTR) ALIGNED,     00007900
            ADCBFRPTR POINTER,                                   00008000
            ADCBFRXB (0:2400) BIT(16) BASED(ADCBFRXPTR) ALIGNED, 00008100
            ADCBFRXC (0:2400,1:2) CHAR(1) BASED(ADCBFRXPTR) ALIGNED, 00008200
            ADCBFRXF (0:2400) FIXED BINARY(15) ALIGNED,          00008300
            ADCBFRXPTR POINTER,                                  00008400
            CHRCLASS (0:65) FIXED BINARY(15),                    00008500
            CHRCNT FIXED BINARY(15),                             00008600
            CHRCODE (0:15) CHAR(1) INIT                          00008700
               ('0','1','2','3','4','5','6','7','8','9','A','B','E','D', 00008800
                'I','*'),                                        00008900
            CHRLIST CHAR(16) INIT ('0123456789ABEDI*'),          00009000
            CHRNDX FIXED BINARY(15),                             00009100
            CHRPKNDX (0:65) FIXED BINARY(15),                    00009200
            CHRPKPTR FIXED BINARY(15,1),                         00009300
            CHRWGHT FIXED BINARY(15),                            00009400
            CHRWGHTI FIXED BINARY(15,7),                         00009500
            CLASS FIXED BINARY(15),                              00009600
            CLASSERR1 FIXED BINARY(15),                          00009700
            CLASSERR2 FIXED BINARY(15),                          00009800
            GRIDCNT FIXED BINARY(15),                            00009900
            GRIDCOR (0:20) FIXED BINARY(15),                     00010000
            GRIDNOS (0:20) FIXED BINARY(15,1),                   00010100
            GRIDSTP (0:20) FIXED BINARY(15),                     00010200
```

```
      GRIDPTR FIXED BINARY(15),                                           00010300
      GRIDCENT (0:2,0:7) FIXED BINARY(15,1),    /*GRID CENTERS    */      00010400
      GRIDVALU (0:2,-3:56) FIXED BINARY(15),    /*GRID VALUE      */      00010500
      GRIDZONE (0:2,-3:56) FIXED BINARY(15),    /*ZONE REFERENCE  */      00010600
      NPKCNT FIXED BINARY(15),                                            00010700
      NPKLOC  (0:7) FIXED BINARY(15,1),                                   00010800
      NPKMAG  (0:7) FIXED BINARY(15),                                     00010900
      NZMAG   (0:8) FIXED BINARY(15),                                     00011000
      RECOLINE CHAR(66) VAR,                                              00011100
      PPKCNT FIXED BINARY(15),                                            00011200
      PPKLOC  (0:7) FIXED BINARY(15,1),                                   00011300
      PPKMAG  (0:7) FIXED BINARY(15),                                     00011400
      PZMAG   (0:8) FIXED BINARY(15),                                     00011500
      ZERO FIXED BINARY(15),                                              00011600
      ZONERR1 (0:7) FIXED BINARY(15),                                     00011700
      ZONERR2 (0:6) FIXED BINARY(15),                                     00011800
      ZONELOC FIXED BINARY(15,1),                                         00011900
      ZONELOC1 (0:7) FIXED BINARY(15,1),                                  00012000
      ZONEVAL1 (0:7) FIXED BINARY(15),                                    00012100
      ZONEVAL2 (0:6) FIXED BINARY(15);                                    00012200
                                                                          00012300
/*----------------------------------------------------------------*/      00012400
/* ZONE LIMITS TABLE DECLARES                                     */      00012500
/*----------------------------------------------------------------*/      00012600
                                                                          00012700
   DECLARE                                                                00012800
      ZONECUTOFF FIXED (6,3) INIT(.008),                                  00012900
      ZONELIM1H (0:13,0:7) FIXED BINARY(15),                              00013000
      ZONELIM2H (0:13,0:6) FIXED BINARY(15),                              00013100
      ZONELIM1L (0:13,0:7) FIXED BINARY(15),                              00013200
      ZONELIM2L (0:13,0:6) FIXED BINARY(15),                              00013300
      ZONETBL FILE;                                                       00013400
                                                                          00013500
/*----------------------------------------------------------------*/      00013600
/* INITIALIZE DATA                                                */      00013700
/*----------------------------------------------------------------*/      00013800
                                                                          00013900
   ADCBFRPTR = ADDR(ADCBFRF);                                             00014000
   ADCBFRXPTR = ADDR(ADCBFRXF);                                           00014100
   TEMPPTR = ADDR(TEMPF);                                                 00014200
   PARM = PARM || ';';                                                    00014300
   GET STRING (PARM) DATA;                                                00014400
   CONDCODE = 0;                                                          00014500
   ON ENDFILE (ZONETBL) CONDCODE = 1;                                     00014600
   PUT FILE (SYSPRINT) SKIP EDIT                                          00014700
      ('* INITIALIZING ZONE LIMITS TABLE')(A);                            00014800
   GET FILE (ZONETBL) SKIP EDIT (ZONECUTOFF) (F(6,3));                    00014900
   DO I = 0 TO 13;                                                        00015000
      GET FILE (ZONETBL) SKIP EDIT                                        00015100
         (ZONELIM1H(I,0),ZONELIM2H(I,0),                                  00015200
          ZONELIM1H(I,1),ZONELIM2H(I,1),                                  00015300
          ZONELIM1H(I,2),ZONELIM2H(I,2),                                  00015400
          ZONELIM1H(I,3),ZONELIM2H(I,3),                                  00015500
          ZONELIM1H(I,4),ZONELIM2H(I,4),                                  00015600
          ZONELIM1H(I,5),ZONELIM2H(I,5),                                  00015700
          ZONELIM1H(I,6),ZONELIM2H(I,6),                                  00015800
          ZONELIM1H(I,7)) (15 F(5));                                      00015900
      GET FILE (ZONETBL) SKIP EDIT                                        00016000
         (ZONELIM1L(I,0),ZONELIM2L(I,0),                                  00016100
          ZONELIM1L(I,1),ZONELIM2L(I,1),                                  00016200
          ZONELIM1L(I,2),ZONELIM2L(I,2),                                  00016300
          ZONELIM1L(I,3),ZONELIM2L(I,3),                                  00016400
          ZONELIM1L(I,4),ZONELIM2L(I,4),                                  00016500
          ZONELIM1L(I,5),ZONELIM2L(I,5),                                  00016600
          ZONELIM1L(I,6),ZONELIM2L(I,6),                                  00016700
          ZONELIM1L(I,7)) (15 F(5));                                      00016800
   END;                                                                   00016900
                                                                          00017000
/*----------------------------------------------------------------*/      00017100
/* GENERATE GRID SPECIFICATION TABLES                             */      00017200
/*----------------------------------------------------------------*/      00017300
                                                                          00017400
   PUT FILE (SYSPRINT) SKIP EDIT ('* INITIALIZING GRID TABLES') (A);      00017500
   GRIDZONE = 7;                                                          00017600
   GRIDVALU = 0;                                                          00017700
   DO I = 0 TO 2;                            /* LOOP THRU GRID STEPS */   00017800
      L = 0;                                 /* GRID CENTER          */   00017900
      M = 0;                                 /* 8'THS COUNTER        */   00018000
```

```
            IF I = 0 THEN N = -1;                                            00018100
            ELSE IF I = 1 THEN N = -3;                                       00018200
            ELSE IF I = 2 THEN N = 1;                                        00018300
            DO J = 0 TO 7;                       /* LOOP THRU TIME ZONES */  00018400
               GRIDCENT(I,J) = L/2;                                          00018500
               DO K = -3 TO 3;                   /* GENERATE SAW TOOTH   */  00018600
                  GRIDZONE(I,L+K) = J;                                       00018700
                  GRIDVALU(I,L+K) = 3-ABS(K);                                00018800
               END;                                                          00018900
               L = L + 7;                                                    00019000
               M = M + N;                                                    00019100
               IF M < -4 THEN                                                00019200
                  DO;                                                        00019300
                     L = L - 1;                                              00019400
                     M = M + 8;                                              00019500
                  END;                                                       00019600
               IF M >= 4 THEN                                                00019700
                  DO;                                                        00019800
                     L = L + 1;                                              00019900
                     M = M - 8;                                              00020000
                  END;                                                       00020100
            END;                                                             00020200
         END;                                                                00020300
                                                                             00020400
   /*----------------------------------------------------------------*/      00020500
   /* MAIN PROCEDURE                                                 */      00020600
   /*----------------------------------------------------------------*/      00020700
                                                                             00020800
      PUT FILE (SYSPRINT) SKIP EDIT ('* BEGINNING CHARACTER RECOGNITION')    00020900
         (A);                                                                00021000
      IF CONDCODE = 1 THEN CONDCODE = 0;                                     00021100
      ON ENDFILE (MICRIN) CONDCODE = 1;                                      00021200
      DO WHILE (CONDCODE=0);                                                 00021300
         READ FILE (MICRIN) INTO (MICRREC);                                  00021400
         IF CONDCODE = 0 THEN                                                00021500
            DO;                                                              00021600
               DOCCNT = DOCCNT + 1;                                          00021700
               DOCID = SUBSTR(MICRREC,5,16);                                 00021800
               CALL UNFRMT;                                                  00021900
               CALL ADCSV;                                                   00022000
               CALL RECOSV;                                                  00022100
               PUT FILE (SYSPRINT) SKIP(2) EDIT                              00022200
                  (DOCID,CODELINE) (A,X(4),A);                               00022300
               PUT FILE (SYSPRINT) SKIP EDIT (RECOLINE) (X(20),A);           00022400
            END;                                                             00022500
      END;                                                                   00022600
      IF CONDCODE = 1 THEN CONDCODE = 0;                                     00022700
                                                                             00022800
   /*----------------------------------------------------------------*/      00022900
   /* UNFORMAT SUBROUTINE                                            */      00023000
   /*                                                                */      00023100
   /* BREAKS DOWN MICRREC INTO ITS COMPONENTS:                       */      00023200
   /*     DONN000000.0000.0000  CONNXX...XX   ZONN  AONNXX...XX  E   */      00023300
   /*----------------------------------------------------------------*/      00023400
                                                                             00023500
   UNFRMT: PROC REORDER;                                                     00023600
                                                                             00023700
      DECLARE                                                                00023800
         A CHAR(2) ALIGNED,                                                  00023900
         N FIXED BINARY(15);                                                 00024000
                                                                             00024100
      ADCBFRS = '';                                                          00024200
      CODELINE = '';                                                         00024300
      ZERO = 0;                                                              00024400
      MICRRECPTR = 21;                         /* SKIP DOCUMENT ID */        00024500
      DO WHILE (MICRRECPTR < LENGTH(MICRREC));                               00024600
         UNSPEC(N) = UNSPEC(SUBSTR(MICRREC,MICRRECPTR+2,2));                 00024700
         IF SUBSTR(MICRREC,MICRRECPTR,1)= 'A' THEN                           00024800
            DO;                                                              00024900
               ADCBFRS = SUBSTR(MICRREC,MICRRECPTR+4,N);                     00025000
               ADCSPTR = N/2 - 1;                                            00025100
            END;                                                             00025200
         ELSE IF SUBSTR(MICRREC,MICRRECPTR,1) = 'Z' THEN                     00025300
            DO;                                                              00025400
               A = SUBSTR(MICRREC,MICRRECPTR+4,N);                           00025500
               UNSPEC(ZERO) = UNSPEC(A);                                     00025600
            END;                                                             00025700
```

```
        ELSE IF SUBSTR(MICRREC,MICRRECPTR,1) = 'C' THEN            00025800
            DO;                                                    00025900
                CODELINE = SUBSTR(MICRREC,MICRRECPTR+4,N);         00026000
            END;                                                   00026100
        ELSE                                                       00026200
            DO;                                                    00026300
                PUT FILE (SYSPRINT) SKIP EDIT                      00026400
                  ('UNKNOWN RECORD CODE ENCOUNTERED, RUN CANCELLED') (A); 00026500
                CONDCODE = 16;                                     00026600
                MICRRECPTR = LENGTH(MICRREC);                      00026700
            END;                                                   00026800
        IF MICRRECPTR < LENGTH(MICRREC) THEN                       00026900
            MICRRECPTR = MICRRECPTR + 4 + N;                       00027000
    END;                                                           00027100
    IF LENGTH(CODELINE) > 0 THEN                                   00027200
        DO;                                                        00027300
            CODECNT = -1;                                          00027400
            DO I = LENGTH(CODELINE) TO 1 BY -1;                    00027500
                CODECNT = CODECNT + 1;                             00027600
                CODECLASS(CODECNT) =                               00027700
                    INDEX(CHRLIST,SUBSTR(CODELINE,I,1))-1;         00027800
            END;                                                   00027900
        END;                                                       00028000
                                                                   00028100
END UNFRMT;                                                        00028200
                                                                   00028300
/*----------------------------------------------------------*/     00028400
/* ADC DATA PROCESSING SUBROUTINE                           */     00028500
/*                                                          */     00028600
/* FILTER WAVEFORM DATA, GENERATE BACKGROUND VALUES, AND    */     00028700
/* GENERATE PEAK TABLES                                     */     00028800
/*----------------------------------------------------------*/     00028900
                                                                   00029000
ADCSV: PROC REORDER;                                               00029100
                                                                   00029200
    DECLARE                                                        00029300
        ADC1 FIXED BINARY(15),                                     00029400
        ADC1C FIXED BINARY(15),                                    00029500
        ADC2 FIXED BINARY(15),                                     00029600
        ADC2C FIXED BINARY(15),                                    00029700
        ADC3 FIXED BINARY(15),                                     00029800
        ADC3C FIXED BINARY(15),                                    00029900
        ADC4 FIXED BINARY(15),                                     00030000
        ADC4C FIXED BINARY(15),                                    00030100
        BGBFR (0:15) FIXED BINARY(15),                             00030200
        BGSUM FIXED BINARY(15),                                    00030300
        BGPTR FIXED BINARY(15),                                    00030400
        BGVALU FIXED BINARY(15),                                   00030500
        FLTRBFR(0:79) FIXED BINARY(15),                            00030600
        OFFSET FIXED BINARY(15),                                   00030700
        POSPKFLG BIT(1);                                           00030800
                                                                   00030900
    ADCCPTR = 0;                                                   00031000
    FLTRBFR = 0;                                                   00031100
    BGBFR = 0;                                                     00031200
    BGSUM = 0;                                                     00031300
    BGPTR = 0;                                                     00031400
    CHRCNT = -1;                                                   00031500
    ADCPKCNT = 0;                                                  00031600
    ADCPKPTR(0) = 0;                                               00031700
    ADCPKPTR(1) = 4095;                                            00031800
    OFFSET = ZERO - 128;                                           00031900
                                                                   00032000
    DO ADCFPTR = 0 TO ADCSPTR;                                     00032100
        TEMPF = 0;                             /* PROCESS HI DATA */ 00032200
        TEMPC(2) = ADCBFRC(ADCFPTR,1);                             00032300
        TEMPF = TEMPF - OFFSET - 128;                              00032400
        IF FILTER = 1 THEN                                         00032500
            DO;                                                    00032600
                FLTRBFR(2) = TEMPF;                                00032700
                TEMPF = (F1C0*FLTRBFR(0) + F1C1*FLTRBFR(1) +       00032800
                        F1C2*FLTRBFR(2))/128;                      00032900
            END;                                                   00033000
        ELSE IF FILTER = 2 THEN                                    00033100
            DO;                                                    00033200
                FLTRBFR(4) = TEMPF;                                00033300
```

```
                TEMPF = (F2C0*FLTRBFR(0) + F2C1*FLTRBFR(1) +            00033400
                        F2C2*FLTRBFR(2) + F2C3*FLTRBFR(3) +             00033500
                        F2C4*FLTRBFR(4))/128;                           00033600
            END;                                                        00033700
        ELSE IF FILTER = 3 THEN                                         00033800
            DO;                                                         00033900
                FLTRBFR(6) = TEMPF;                                     00034000
                TEMPF = (F3C0*FLTRBFR(0) + F3C1*FLTRBFR(1) +            00034100
                        F3C2*FLTRBFR(2) + F3C3*FLTRBFR(3) +             00034200
                        F3C4*FLTRBFR(4) + F3C5*FLTRBFR(5) +             00034300
                        F3C6*FLTRBFR(6))/128;                           00034400
            END;                                                        00034500
        TEMPF = TEMPF + 128;                                            00034600
        IF TEMPF < 0 THEN TEMPF = 0;                                    00034700
        ELSE IF TEMPF > 255 THEN TEMPF = 255;                           00034800
130     ADCBFRXC(ADCFPTR,1) = TEMPC(2);                                 00034900
        TEMPF = 0;                              /* PROCESS LO DATA */   00035000
110     TEMPC(2) = ADCBFRC(ADCFPTR,2);                                  00035100
120     TEMPF = TEMPF - OFFSET - 128;                                   00035200
        IF FILTER = 1 THEN                                              00035300
            DO;                                                         00035400
                FLTRBFR(3) = TEMPF;                                     00035500
120             TEMPF = (F1C0*FLTRBFR(1) + F1C1*FLTRBFR(2) +            00035600
                        F1C2*FLTRBFR(3))/128;                           00035700
                FLTRBFR(0) = FLTRBFR(2);                                00035800
                FLTRBFR(1) = FLTRBFR(3);                                00035900
            END;                                                        00036000
        ELSE IF FILTER = 2 THEN                                         00036100
            DO;                                                         00036200
                FLTRBFR(5) = TEMPF;                                     00036300
                TEMPF = (F2C0*FLTRBFR(1) + F2C1*FLTRBFR(2) +            00036400
                        F2C2*FLTRBFR(3) + F2C3*FLTRBFR(4) +             00036500
                        F2C4*FLTRBFR(5))/128;                           00036600
                FLTRBFR(0) = FLTRBFR(2);                                00036700
                FLTRBFR(1) = FLTRBFR(3);                                00036800
                FLTRBFR(2) = FLTRBFR(4);                                00036900
                FLTRBFR(3) = FLTRBFR(5);                                00037000
            END;                                                        00037100
        ELSE IF FILTER = 3 THEN                                         00037200
            DO;                                                         00037300
                FLTRBFR(7) = TEMPF;                                     00037400
                TEMPF = (F3C0*FLTRBFR(1) + F3C1*FLTRBFR(2) +            00037500
                        F3C2*FLTRBFR(3) + F3C3*FLTRBFR(4) +             00037600
                        F3C4*FLTRBFR(5) + F3C5*FLTRBFR(6) +             00037700
                        F3C6*FLTRBFR(7))/128;                           00037800
                FLTRBFR(0) = FLTRBFR(2);                                00037900
                FLTRBFR(1) = FLTRBFR(3);                                00038000
                FLTRBFR(2) = FLTRBFR(4);                                00038100
                FLTRBFR(3) = FLTRBFR(5);                                00038200
                FLTRBFR(4) = FLTRBFR(6);                                00038300
                FLTRBFR(5) = FLTRBFR(7);                                00038400
            END;                                                        00038500
        TEMPF = TEMPF + 128;                                            00038600
        IF TEMPF < 0 THEN TEMPF = 0;                                    00038700
        ELSE IF TEMPF > 255 THEN TEMPF = 255;                           00038800
130     ADCBFRXC(ADCFPTR,2) = TEMPC(2);                                 00038900
        TEMPF = ABS(TEMPF-128);                 /* UPDATE BACKGROUND BFR */ 00039000
        BGSUM = BGSUM - BGBFR(BGPTR) + TEMPF;                           00039100
        BGBFR(BGPTR) = TEMPF;                                           00039200
        BGPTR = BGPTR + 1;                                              00039300
        IF BGPTR = 16 THEN BGPTR = 0;                                   00039400
        BGVALU = MAX(BGSUM/16+128,BGMIN);                               00039500
        IF ADCFPTR > 8 THEN                                             00039600
            DO;                                 /* TEST FOR PEAK */     00039700
                ADCPPTR = ADCFPTR - 8;                                  00039800
                TEMPF = 0;                                              00039900
                TEMPC(2) = ADCBFRXC(ADCPPTR-1,2);                       00040000
                ADC1 = TEMPF;                                           00040100
                ADC1C = 255 - ADC1;                                     00040200
                TEMPC(2) = ADCBFRXC(ADCPPTR,1);                         00040300
                ADC2 = TEMPF;                                           00040400
                ADC2C = 255 - ADC2;                                     00040500
                TEMPC(2) = ADCBFRXC(ADCPPTR,2);                         00040600
                ADC3 = TEMPF;                                           00040700
                ADC3C = 255 - ADC3;                                     00040800
                TEMPC(2) = ADCBFRXC(ADCPPTR+1,1);                       00040900
                ADC4 = TEMPF;                                           00041000
                ADC4C = 255 - ADC4;                                     00041100
```

```
            POSPKFLG = '0'B;                                          00041200
            IF ADC2 > BGVALU & ADC2 > ADC1 & ADC2 >= ADC3 THEN        00041300
              GOTO ADCSV1;                                            00041400
            IF ADC2C > BGVALU & ADC2C > ADC1C & ADC2C >=ADC3C THEN    00041500
              GOTO ADCSV2;                                            00041600
            ADCPPTR = ADCPPTR + 0.5;                                  00041700
            IF ADC3 > BGVALU & ADC3 > ADC2 & ADC3 >= ADC4 THEN        00041800
              GOTO ADCSV1;                                            00041900
            IF ADC3C > BGVALU & ADC3C > ADC2C & ADC3C >= ADC4C THEN   00042000
              GOTO ADCSV2;                                            00042100
            GOTO ADCSVX;                                              00042200
  ADCSV1:   POSPKFLG = '1'B;                                          00042300
  ADCSV2:   IF ADCPKCNT < 398 THEN         /* SAVE PEAK LOCATION */   00042400
              DO;                                                     00042500
                ADCPKCNT = ADCPKCNT + 1;                              00042600
                ADCPKPTR(ADCPKCNT) = ADCPPTR;                         00042700
                ADCPKPTR(ADCPKCNT+1) = 4095;                          00042800
                IF POSPKFLG THEN                                      00042900
                  IF ADCPPTR - ADCCPTR > CW1 THEN                     00043000
                    DO;                        /* NEW CHARACTER */    00043100
                      CHRCNT = CHRCNT + 1;                            00043200
                      CHRPKNDX(CHRCNT) = ADCPKCNT;                    00043300
                      ADCCPTR = ADCPPTR;                              00043400
                    END;                                              00043500
              END;                                                    00043600
  ADCSVX:   END;                                                      00043700
            END;                                                      00043800
                                                                      00043900
  END ADCSV;                                                          00044000
                                                                      00044100
  /*------------------------------------------------------------*/    00044200
  /* PEAK DATA PROCESSING SUBROUTINE                            */    00044300
  /*                                                            */    00044400
  /* RECO WAVEFORM DATA                                         */    00044500
  /*------------------------------------------------------------*/    00044600
                                                                      00044700
  RECOSV: PROC REORDER;                                               00044800
                                                                      00044900
    DECLARE                                                           00045000
      I,J,K,L,M,N FIXED BINARY(15);                                   00045100
                                                                      00045200
  /*------------------------------------------------------------*/    00045300
  /* INITIAL CHARACTER RECOGNITION                              */    00045400
  /*------------------------------------------------------------*/    00045500
                                                                      00045600
    DO CHRNDX = 0 TO CHRCNT;                                          00045700
      ADCPKNDX = CHRPKNDX(CHRNDX);                                    00045800
      CALL RECO;                                                      00045900
      CHRCLASS(CHRNDX) = CLASS;                                       00046000
    END;                                                              00046100
                                                                      00046200
  /*------------------------------------------------------------*/    00046300
  /* RETRY RECOGNITION USING 2ND PEAK OF REJECTED CHARACTERS    */    00046400
  /*------------------------------------------------------------*/    00046500
                                                                      00046600
    IF RETRY = 1 THEN                                                 00046700
      DO;                                                             00046800
        DO CHRNDX = CHRCNT-1 TO 0 BY -1;   /* LEFT TO RIGHT RECO */   00046900
          IF CHRCLASS(CHRNDX) = CLASSR THEN                           00047000
            IF CHRCLASS(CHRNDX+1) <= 13 THEN                          00047100
              DO;                                                     00047200
                N = ADCPKPTR(CHRPKNDX(CHRNDX+1)) -                    00047300
                    ADCPKPTR(CHRPKNDX(CHRNDX)+1);                     00047400
                IF N >= RW1 & N <= RW2 THEN                           00047500
                  DO;                                                 00047600
                    ADCPKNDX = CHRPKNDX(CHRNDX) + 1;                  00047700
                    CALL RECO;                                        00047800
                    IF CLASS <= 13 THEN                               00047900
                      DO;                                             00048000
                        CHRPKNDX(CHRNDX) = CHRPKNDX(CHRNDX)+1;        00048100
                        CHRCLASS(CHRNDX) = CLASS;                     00048200
                      END;                                            00048300
                  END;                                                00048400
              END;                                                    00048500
        END;                                                          00048600
      END;                                                            00048700
                                                                      00048800
```

```
    IF RETRY = 1 THEN                                                   00048900
       DO;                                                              00049000
          DO CHRNDX = 1 TO CHRCNT;            /* RIGHT TO LEFT RECO */  00049100
             IF CHRCLASS(CHRNDX) = CLASSR THEN                          00049200
                IF CHRCLASS(CHRNDX-1) <= 13 THEN                        00049300
                   DO;                                                  00049400
                      N = ADCPKPTR(CHRPKNDX(CHRNDX)+1) -                00049500
                      IF N >= RH1 & N <= RH2 THEN                       00049700
                         DO;                                            00049800
                            ADCPKNDX = CHRPKNDX(CHRNDX) + 1;            00049900
                            CALL RECO;                                  00050000
                            IF CLASS <= 13 THEN                         00050100
                               DO;                                      00050200
                                  CHRPKNDX(CHRNDX) = CHRPKNDX(CHRNDX)+1;00050300
                                  CHRCLASS(CHRNDX) = CLASS;             00050400
                               END;                                     00050500
                         END;                                           00050600
                      END;                                              00050700
             END;                                                       00050800
          END;                                                          00050900
                                                                        00051000
/*---------------------------------------------------------------*/    00051100
/* GENERATE RECOLINE                                             */    00051200
/*---------------------------------------------------------------*/    00051300
                                                                        00051400
   RECOLINE = '';                                                       00051500
   DO CHRNDX = CHRCNT TO 0 BY -1;                                       00051600
      RECOLINE = RECOLINE || CHRCODE(CHRCLASS(CHRNDX));                 00051700
   END;                                                                 00051800
                                                                        00051900
END RECOSV;                                                             00052000
                                                                        00052100
/*---------------------------------------------------------------*/    00052200
/* RECO SUBROUTINE                                               */    00052300
/*                                                               */    00052400
/* UTILITY ROUTINE TO DO CHARACTER RECOGNITION                   */    00052500
/*---------------------------------------------------------------*/    00052600
                                                                        00052700
RECO: PROC REORDER;                                                     00052800
                                                                        00052900
   DECLARE                                                              00053000
      I,J,K,L,M,N FIXED BINARY(15),                                     00053100
      MINCLASS FIXED BINARY(15),                                        00053200
      MINCLASSERR1 FIXED BINARY(15),                                    00053300
      MINCLASSERR2 FIXED BINARY(15),                                    00053400
      MINERROR FIXED BINARY(15),                                        00053500
      MINPTR FIXED BINARY(15);                                          00053600
                                                                        00053700
/*---------------------------------------------------------------*/    00053800
/* DO CHARACTER RECOGNITION                                      */    00053900
/*---------------------------------------------------------------*/    00054000
                                                                        00054100
   CALL GETPEAKS;                                                       00054200
   CALL GETGRIDS;                                                       00054300
   MINERROR = 2047;                                                     00054400
   MINCLASS = CLASSR;                                                   00054500
   DO GRIDPTR = 0 TO GRIDLIM;                                           00054600
      CALL GETZONES;                                                    00054700
      CALL GETCLASS;                                                    00054800
      IF CLASS <= 13 THEN                                               00054900
         DO;                                                            00055000
            GOTO RECO1;                                                 00055200
            IF CLASSERR1 + CLASSERR2 < MINERROR THEN                    00055300
               DO;                                                      00055400
                  MINERROR = CLASSERR1 + CLASSERR2;                     00055500
                  MINCLASS = CLASS;                                     00055600
                  MINCLASSERR1 = CLASSERR1;                             00055700
                  MINCLASSERR2 = CLASSERR2;                             00055800
                  MINPTR = GRIDPTR;                                     00055900
               END;                                                     00056000
         END;                                                           00056100
   END;                                                                 00056200
   IF MINCLASS ¬= CLASSR THEN                                           00056300
      DO;                                                               00056400
         GRIDPTR = MINPTR;                                              00056500
         CALL GETZONES;         /* REGEN ZONEVAL'S FOR SUB CHECKING */  00056600
```

```
            CLASS = MINCLASS;
            CLASSERR1 = MINCLASSERR1;        /* SAVE CLASSERR'S FOR STATS */
            CLASSERR2 = MINCLASSERR2;
         END;

RECO1:

/*---------------------------------------------------------------*/
/* DO FINAL CHECKING                                             */
/*---------------------------------------------------------------*/

IF CHRWGHT < IW1 THEN CLASS = CLASSI;
   IF CLASS = CLASSR & PPKCNT = 0 & NPKCNT <= 0 & CHRWGHT < IW2 THEN
      CLASS = CLASSI;

END RECO;

/*---------------------------------------------------------------*/
/* GETPEAKS SUBROUTINE                                           */
/*                                                               */
/* GENERATE POSITIVE AND NEGATIVE PEAK TABLES, AND               */
/*---------------------------------------------------------------*/

GETPEAKS: PROC REORDER;

/*---------------------------------------------------------------*/
/* FIND POSITIVE PEAKS                                           */
/*---------------------------------------------------------------*/

PPKCNT = -1;
   NPKCNT = -1;
   CHRPKPTR = ADCPKPTR(ADCPKNDX);
   DO WHILE (ADCPKPTR(ADCPKNDX) <= CHRPKPTR+28);
      ADCFPTR = ADCPKPTR(ADCPKNDX);
      TEMPF = 0;
      IF UNSPEC(ADCFPTR) & '0000000000000001'B THEN
         TEMPC(2) = ADCBFRXC(ADCFPTR,2);                 /* ODD  */
      ELSE TEMPC(2) = ADCBFRXC(ADCFPTR,1);               /* EVEN */
      IF TEMPF > 128 THEN
         ELSE
            DO;
               IF NPKCNT < 7 THEN
                  DO;
                     NPKCNT = NPKCNT + 1;
                     NPKLOC(NPKCNT) = ADCFPTR - CHRPKPTR;
                     NPKMAG(NPKCNT) = 128 - TEMPF;
                  END;
            END;
      ADCPKNDX = ADCPKNDX + 1;
   END;

END GETPEAKS;

/*---------------------------------------------------------------*/
/* GETGRIDS SUBROUTINE                                           */
/*                                                               */
/* SELECTS THE NINE BEST FITTING GRIDS                           */
/*---------------------------------------------------------------*/

GETGRIDS: PROC REORDER;

DECLARE
      F FIXED BINARY(15,1),
      I,J,K,L,M,N FIXED BINARY(15);

/*---------------------------------------------------------------*/
/* FIND GRID CORRELATION FOR EACH STEP SIZE AND OFFSET           */
/*---------------------------------------------------------------*/

GRIDCNT = -1;
   DO I = 0 TO 2;
      M = 0;
      DO K = 1 TO PPKCNT;
         L = PPKLOC(K)*2;
         M = M + PPKMAG(K) * GRIDVALU(I,L);
      END;
```

```
        DO J = -3 TO 3;                                              00065100
          N = M;                                                     00065200
          DO K = 0 TO NPKCNT;                                        00065300
            L = NPKLOC(K)*2 - J;                                     00065400
            N = N + NPKMAG(K) * GRIDVALU(I,L);                       00065500
          END;                                                       00065600
          GRIDCNT = GRIDCNT + 1;                                     00065700
          GRIDSTP(GRIDCNT) = I;                                      00065800
          GRIDNOS(GRIDCNT) = J/2;                                    00065900
          GRIDCOR(GRIDCNT) = N;                                      00066000
        END;                                                         00066100
      END;                                                           00066200
                                                                     00066300
/*-------------------------------------------------------------*/    00066400
/* SORT GRIDS IN DECREASING GRID CORRELATION ORDER             */    00066500
/*-------------------------------------------------------------*/    00066600
                                                                     00066700
      DO I = 0 TO GRIDLIM;                                           00066800
        M = 0;                                                       00066900
        DO J = I TO GRIDCNT;                                         00067000
          IF GRIDCOR(J) > M THEN                                     00067100
            DO;                                                      00067200
              M = GRIDCOR(J);                                        00067300
              N = J;                                                 00067400
            END;                                                     00067500
        END;                                                         00067600
        GRIDCOR(N) = GRIDCOR(I);                                     00067700
        GRIDCOR(I) = M;                                              00067800
        F = GRIDNOS(N);                                              00067900
        GRIDNOS(N) = GRIDNOS(I);                                     00068000
        GRIDNOS(I) = F;                                              00068100
        M = GRIDSTP(N);                                              00068200
        GRIDSTP(N) = GRIDSTP(I);                                     00068300
        GRIDSTP(I) = M;                                              00068400
      END;                                                           00068500
                                                                     00068600
END GETGRIDS;                                                        00068700
                                                                     00068800
/*-------------------------------------------------------------*/    00068900
/* GETZONES SUBROUTINE                                         */    00069000
/*                                                             */    00069100
/* CALCULATES TIME ZONE VALUES USING THE CURRENT GRID.         */    00069200
/*-------------------------------------------------------------*/    00069300
                                                                     00069400
GETZONES: PROC REORDER;                                              00069500
                                                                     00069600
  DECLARE                                                            00069700
    I,J,K,L,M,N FIXED BINARY(15);                                    00069800
                                                                     00069900
/*-------------------------------------------------------------*/    00070000
/* GENERATE TIME ZONE LOCATIONS AND VALUES                     */    00070100
/*-------------------------------------------------------------*/    00070200
                                                                     00070300
  DO I = 0 TO 7;                                                     00070400
    PZMAG(I) = 0;                                                    00070500
    NZMAG(I) = 0;                                                    00070600
  END;                                                               00070700
  DO I = 0 TO PPKCNT;                                                00070800
    J = PPKLOC(I) * 2;                                               00070900
    PZMAG(GRIDZONE(GRIDSTP(GRIDPTR),J)) = PPKMAG(I);                 00071000
  END;                                                               00071100
  DO I = 0 TO NPKCNT;                                                00071200
    J = (NPKLOC(I)-GRIDNOS(GRIDPTR)) * 2;                            00071300
    NZMAG(GRIDZONE(GRIDSTP(GRIDPTR),J)) = NPKMAG(I);                 00071400
  END;                                                               00071500
  CHRWGHT = 0;                                                       00071600
  DO I = 0 TO 7;                                                     00071700
    ZONELOC = CHRPKPTR + GRIDCENT(GRIDSTP(GRIDPTR),I);               00071800
    IF NZMAG(I) > PZMAG(I) THEN ZONELOC = ZONELOC + GRIDNOS(GRIDPTR);00071900
    ADCFPTR = ZONELOC;                                               00072000
    ZONELOC1(I) = ZONELOC;                                           00072100
    TEMPF = 0;                                                       00072200
    IF UNSPEC(ZONELOC) & '0000000000000001'B THEN                    00072300
      TEMPC(2) = ADCBFRXC(ADCFPTR,2);            /* ODD  */          00072400
    ELSE TEMPC(2) = ADCBFRXC(ADCFPTR,1);         /* EVEN */          00072500
```

```
         ZONEVAL1(I) = TEMPF - 128;                                    00072600
         CHRWGHT = CHRWGHT + ABS(ZONEVAL1(I));                         00072700
      END;                                                             00072800
      IF CHRWGHT < 16 THEN CHRWGHT = 16;                               00072900
      CHRWGHTI = 256.0000/CHRWGHT;                                     00073000
      DO I = 0 TO 7;                                                   00073100
         ZONEVAL1(I) = ZONEVAL1(I) * CHRWGHTI + 128;                   00073200
      END;                                                             00073300
      DO I = 0 TO 6;                                                   00073400
         ZONELOC = ZONELOC1(I) + (ZONELOC1(I+1)-ZONELOC1(I))/2;        00073500
         ADCFPTR = ZONELOC;                                            00073600
         TEMPF = 0;                                                    00073700
         IF UNSPEC(ZONELOC) & '0000000000000001'B THEN                 00073800
            TEMPC(2) = ADCBFRXC(ADCFPTR,2);              /* ODD  */    00073900
         ELSE TEMPC(2) = ADCBFRXC(ADCFPTR,1);            /* EVEN */    00074000
         ZONEVAL2(I) = (TEMPF-128) * CHRWGHTI + 128;                   00074100
      END;                                                             00074200
                                                                       00074300
   END GETZONES;                                                       00074400
                                                                       00074500
/*--------------------------------------------------------------*/     00074600
/* GETCLASS SUBROUTINE                                          */     00074700
/*                                                              */     00074800
/* COMPARES THE ZONE VALUES OF THE UNKNOWN CHARACTER AGAINST THE*/     00074900
/* PRESET LIMITS.                                               */     00075000
/*--------------------------------------------------------------*/     00075100
                                                                       00075200
   GETCLASS: PROC REORDER;                                             00075300
                                                                       00075400
      DECLARE                                                          00075500
         I,J,K,L,M,N FIXED BINARY(15);                                 00075600
                                                                       00075700
/*--------------------------------------------------------------*/     00075800
/* DO CHARACTER RECOGNITION                                     */     00075900
/*--------------------------------------------------------------*/     00076000
                                                                       00076100
      DO CLASS = 0 TO 13;                                              00076200
         CLASSERR1 = 0;                                                00076300
         DO J = 0 TO 7 WHILE (CLASSERR1 <= CLASSERRH);                 00076400
            IF ZONEVAL1(J) > ZONELIM1H(CLASS,J) THEN                   00076500
               CLASSERR1 = CLASSERR1 + ZONEVAL1(J) - ZONELIM1H(CLASS,J);00076600
            ELSE IF ZONEVAL1(J) < ZONELIM1L(CLASS,J) THEN              00076700
               CLASSERR1 = CLASSERR1 + ZONELIM1L(CLASS,J) - ZONEVAL1(J);00076800
         END;                                                          00076900
         IF CLASSERR1 <= CLASSERRH THEN                                00077000
            DO;                                                        00077100
               CLASSERR2 = 0;                                          00077200
               DO J = 0 TO 6 WHILE (CLASSERR2 <= CLASSERRH);           00077300
                  IF ZONEVAL2(J) > ZONELIM2H(CLASS,J) THEN             00077400
                     CLASSERR2 = CLASSERR2+ZONEVAL2(J)-ZONELIM2H(CLASS,J);00077500
                  ELSE IF ZONEVAL2(J) < ZONELIM2L(CLASS,J) THEN        00077600
                     CLASSERR2 = CLASSERR2+ZONELIM2L(CLASS,J)-ZONEVAL2(J);00077700
               END;                                                    00077800
               IF CLASSERR2 <= CLASSERRH THEN RETURN;                  00077900
            END;                                                       00078000
      END;                                                             00078100
      CLASS = CLASSR;                                                  00078200
                                                                       00078300
   END GETCLASS;                                                       00078400
                                                                       00078500
/*--------------------------------------------------------------*/     00078600
/* ALL DONE                                                     */     00078700
/*--------------------------------------------------------------*/     00078800
                                                                       00078900
   PUT FILE (SYSPRINT) SKIP(2) EDIT                                    00079000
      ('MICRSIM COMPLETE -- COMPLETION CODE ',CONDCODE) (A,F(4));      00079100
   CALL PLIRETC(CONDCODE);                                             00079200
                                                                       00079300
END MICRSIM;                                                           00079400
```

Of course, many alternatives to the preferred mode of carrying out the present invention are apparent to those skilled in the art of reading magnetic ink characters through automatic machinery having character recognition algorithms, and furthermore, some features of the present invention may be used without the corresponding use of other features described in this description. For example, while the present invention has been described in terms of identifying characters written in the E13B font which is the preferred use for the present invention, the present system is by no means limited to that font and may have use for the bar code font (CMC-7) used in European checks. Further, by suitable modifications to the apparatus and techniques, the use in optical character recognition is believed feasible. Thus, the foregoing description should be considered as merely illustrative of the preferred embodiment of the present invention and not in limitation thereof, the scope of which invention being defined solely by the appended claims.

Having thus described the invention, what is claimed is:

1. A method for identifying a character printed on a document comprising the steps of:
   generating an analog signal representative of said character as the document passes a read element;
   digitizing and storing values representing said analog signal for said character;
   locating positive and negative peaks associated with said analog signal for said character;
   testing the peaks associated with said character against a first plurality of repeating patterns, having different combinations of period and offset between positive and negative peaks, to determine which of said first plurality of repeating patterns best fit the peaks stored for said character;
   using the one of said plurality of repeating patterns which best fits the peaks to select at least some of the stored digitized values and,
   testing said selected stored digitized values against a second plurality of patterns representing the set of characters which can be identified, to identify the character.

2. A method including the steps of claim 1 and further including the step of:
   using a second-best pattern to select a second set of the stored digitized values if the character is not recognized using the best-fit pattern.

3. A method of identifying a character including the steps of claim 1 and further including the steps of:
   using patterns which fit the patterns of peaks less accurately in successive order until a pattern is used to select samples which leads to an identification of the character.

4. The method including the steps of claim 3 and further including the step of terminating the use of succeeding patterns after a predetermined number of trials has been reached.

5. A method of identifying a character as described in claim 1 wherein the method further includes the step of ignoring an opening peak and attempting to use the remainder of the the stored information to identify the character.

6. A method of identifying a character including the steps of claim 1 and further including the step of normalizing the character over all of the peaks to scale the readings based upon all peaks of the character.

7. A method of identifying a magnetic ink character using a single gap magnetic read head generating a time varying analog signal indicative of change of magnetic ink passing by the magnetic head over time, the steps of the method comprising:
   digitizing and storing values at successive time intervals representative of the analog signal at that time;
   locating peaks in an absolute value sense;
   determining an apparent period of the located peaks and an apparent offset between positive and negative peaks of the located peaks;
   using the apparent period and apparent offset to select from the stored values; and
   testing the selected stored values against a set of values representing the set of characters which can be identified, to attempt to identify the character.

8. The method of identifying a character including the steps described in claim 7 and further including the step of determining a second period and second offset in the event that the character cannot be identified using the stored values selected using the apparent period and apparent offset, and using the second period and second offset to determine a second set of selected stored values which are used to identify the character.

* * * * *